United States Patent
Kwon et al.

(10) Patent No.: US 11,101,510 B2
(45) Date of Patent: Aug. 24, 2021

(54) HEAT-DISSIPATION FLUID COMPOSITION, METHOD OF PREPARING HEAT-DISSIPATION FLUID COMPOSITION, AND BATTERY MODULE AND BATTERY PACK INCLUDING HEAT-DISSIPATION FLUID COMPOSITION

(71) Applicant: LG CHEM, LTD., Seoul (KR)

(72) Inventors: Kyung An Kwon, Daejeon (KR); Moon Seok Chun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 29 days.

(21) Appl. No.: 16/463,311

(22) PCT Filed: Sep. 21, 2018

(86) PCT No.: PCT/KR2018/011214
§ 371 (c)(1),
(2) Date: May 22, 2019

(87) PCT Pub. No.: WO2019/107722
PCT Pub. Date: Jun. 6, 2019

(65) Prior Publication Data
US 2020/0020998 A1    Jan. 16, 2020

(30) Foreign Application Priority Data

Nov. 30, 2017 (KR) ........................ 10-2017-0163595

(51) Int. Cl.
| | |
|---|---|
| *H01M 10/6567* | (2014.01) |
| *H01M 10/653* | (2014.01) |
| *H01M 50/20* | (2021.01) |
| *C09K 5/10* | (2006.01) |

(52) U.S. Cl.
CPC ..... *H01M 10/6567* (2015.04); *H01M 10/653* (2015.04); *C09K 5/10* (2013.01); *H01M 50/20* (2021.01)

(58) Field of Classification Search
CPC ............................ H01M 10/6567; C09K 5/10
See application file for complete search history.

(56) References Cited

U.S. PATENT DOCUMENTS

| | | | | |
|---|---|---|---|---|
| 6,174,841 B1 * | 1/2001 | Yamada | ............... | C10M 111/04 508/172 |
| 8,633,276 B2 | 1/2014 | Domae et al. | | |
| 2010/0279153 A1 | 11/2010 | Payne | | |
| 2014/0190672 A1 | 7/2014 | Swaroop et al. | | |
| 2014/0240928 A1 | 8/2014 | Tien et al. | | |
| 2014/0336432 A1 * | 11/2014 | Bao | .......................... | B01J 27/22 585/417 |
| 2015/0101352 A1 | 4/2015 | Kwak et al. | | |
| 2017/0312657 A1 * | 11/2017 | Shimabayashi | .... | B01D 19/0404 |
| 2019/0135978 A1 * | 5/2019 | Yamaguchi | .............. | C09K 3/10 |

FOREIGN PATENT DOCUMENTS

| | | |
|---|---|---|
| JP | 2007-039621 | 2/2007 |
| JP | 2008-045090 | 2/2008 |
| JP | 2009-286855 | 12/2009 |
| JP | 2014-105283 | 6/2014 |
| JP | 2014-196507 | 10/2014 |
| KR | 10-2010-0119500 | 11/2010 |
| KR | 10-2014-0071975 | 6/2014 |
| KR | 10-2014-0083001 | 7/2014 |
| KR | 10-2014-0100830 | 8/2014 |
| KR | 10-1435608 | 8/2014 |
| KR | 10-2015-0043733 | 4/2015 |
| KR | 10-2016-0135690 | 11/2016 |
| KR | 10-2017-0051024 | 5/2017 |

OTHER PUBLICATIONS

International Search Report and the Written Opinion of PCT/KR2018/011214, dated Jan. 2, 2019.

* cited by examiner

*Primary Examiner* — Ladan Mohaddes
(74) *Attorney, Agent, or Firm* — Dentons US LLP

(57) ABSTRACT

Provided are a heat-dissipation fluid composition, a method of preparing the heat-dissipation fluid composition, and a battery module and battery pack including the heat-dissipation fluid composition. The heat-dissipation fluid composition can include 100 parts by weight of a nonconductive oil; 1 to 30 parts by weight of thermally conductive inorganic particles; and 1 to 30 parts by weight of an inorganic precipitation inhibitor, wherein a viscosity at 20° C. and 50 rpm is 850 cP or more, and a viscosity at 30° C. and 50 rpm is 750 cP or less. The heat-dissipation fluid composition exhibits excellent electrical insulating properties and thermal conductivity and, especially, excellent heat dissipation performance even after long-term use because thermally conductive inorganic particles are not permanently precipitated during use.

15 Claims, 2 Drawing Sheets

[FIG. 1]
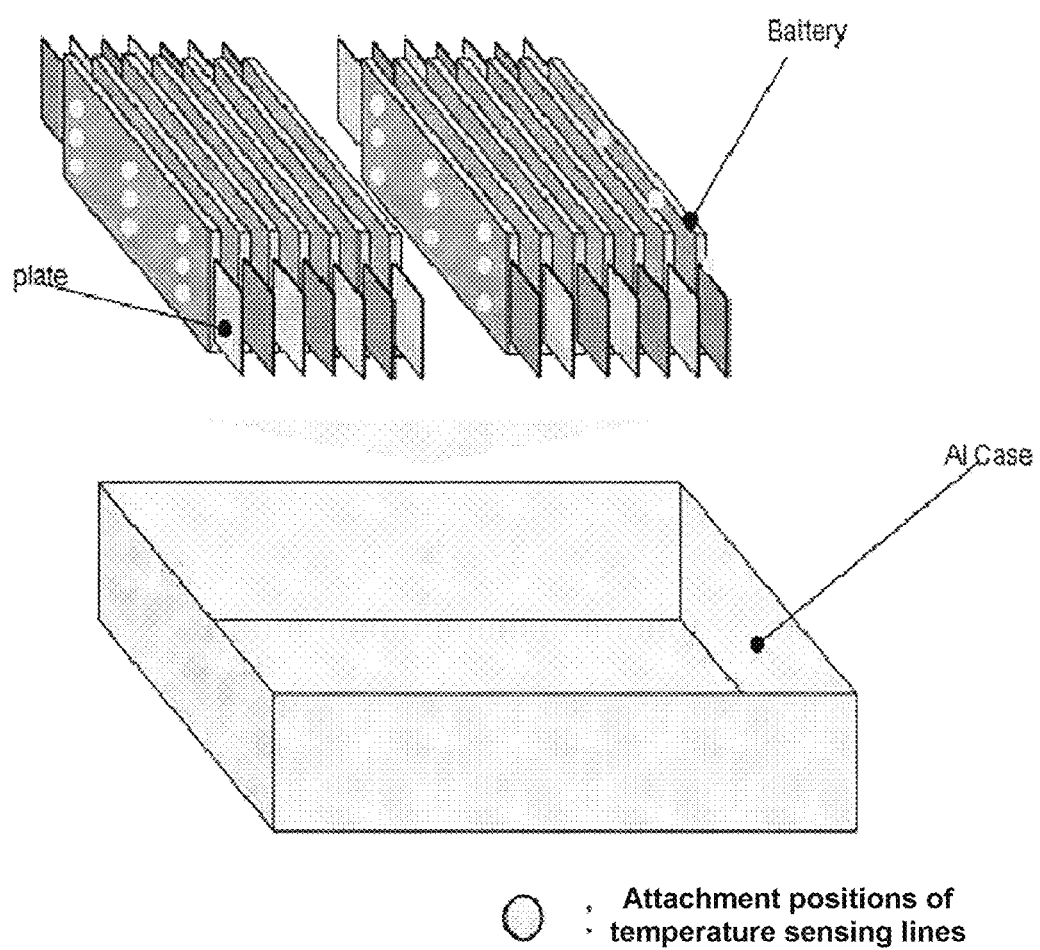

[FIG. 2]
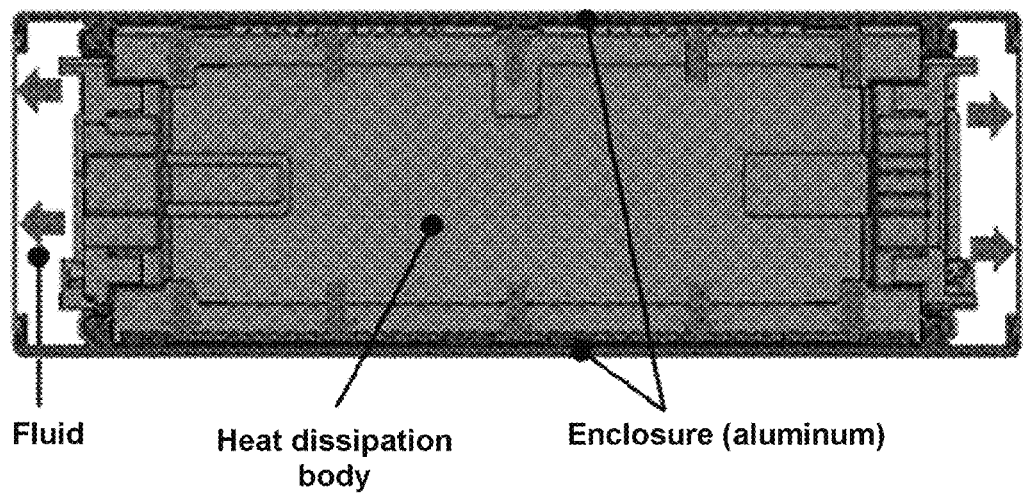
[FIG. 3]
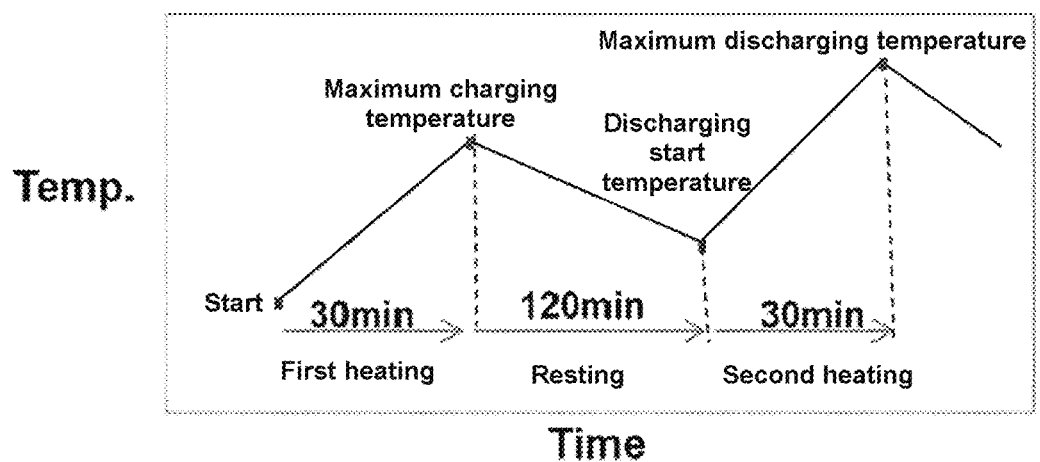

HEAT-DISSIPATION FLUID COMPOSITION, METHOD OF PREPARING HEAT-DISSIPATION FLUID COMPOSITION, AND BATTERY MODULE AND BATTERY PACK INCLUDING HEAT-DISSIPATION FLUID COMPOSITION

CROSS-REFERENCE TO RELATED APPLICATION

This application is a National Stage Application of International Application No. PCT/KR2018/011214 filed on Sep. 21, 2018, which claims priority to Korean Patent Application No. 10-2017-0163595, filed on Nov. 30, 2017 in the Korean Intellectual Property Office, the disclosure of which is incorporated herein by reference in its entirety.

TECHNICAL FIELD

The present disclosure relates to a heat-dissipation fluid composition, a method of preparing the heat-dissipation fluid composition, and a battery module and battery pack including the heat-dissipation fluid composition. More particularly, the present disclosure relates to a heat-dissipation fluid composition that exhibits excellent electrical insulating properties and thermal conductivity and, especially, excellent heat dissipation performance even after long-term use in a battery module because thermally conductive inorganic particles are not permanently precipitated in a heat-dissipation fluid including the heat-dissipation fluid composition, a method of preparing the heat-dissipation fluid composition, and a battery module and battery pack including the heat-dissipation fluid composition.

BACKGROUND ART

Secondary battery technology is a core technology of a smart grid that can store and charge/discharge a large amount of electricity by connecting several types of battery cells in series and parallel. Research into increasing the electric capacity of a battery has been actively carried out at various institutions. This provides a comfortable lifestyle by increasing the range of an electric vehicle and allowing utilization of electric energy stored in a home and the industry.

However, since the thermal density inside a battery module is increased so as to increase the electric capacity of a secondary battery, thermal problems caused by high-speed charging and discharging of large-capacity energy are emerging. If heat inside a battery module cannot be controlled, the lifespan of the battery is rapidly reduced, and there is a risk of explosion and fire.

To address these problems, a high heat dissipation characteristic capable of rapidly discharging heat inside a battery module is required. With regard to this, there is an air-cooling method of driving a fan to discharge the atmospheric air to the outside of a battery module through a battery cell, thereby controlling heat. However, since a fan is used in the method, the volume of the module is maximized, and there are problems such as noise, cost increase, and power consumption due to driving of the fan.

Accordingly, as a substitute for the air-cooling method, a method of impregnating a battery cell with a fluid instead of installing a fan inside a module included in the battery cell is being attempted.

When materials, such as water and ethylene glycol, are used in the method of impregnating a battery cell with a fluid, risks such as explosion of a battery cell may occur due to high electrical conductivity of the materials. Since a fluid applied to the interior of a battery should have high electrical insulating properties, oil-based fluids are being often tested as a refrigerant. Until now, engine oils and gear oils have been known as heat transfer oils, and oils having low electric conductivity, silicone oils, mineral oils, and the like have been known as warm oils. However, since such fluids are insufficient to satisfactorily dissipate heat generated by high-speed charging/discharging, a higher heat radiation characteristic is required.

A method of using a carbon nanotube (CNT) with high thermal conductivity so as to produce a fluid having excellent heat dissipation performance has also been disclosed. However, this method may cause an electric insulation problem. A method of mixing electrical insulation inorganic particles with a heat-dissipation fluid has been attempted to solve the electric insulation problem. However, this method has a problem that inorganic particles are precipitated after a long period due to the weight thereof, and thus, heat dissipation characteristics are significantly decreased.

Although a technique of introducing a dispersant such as a surfactant has been proposed so as to address the precipitation problem, this method has a problem that the electrical insulating properties of a heat-dissipating fluid itself are lowered. A method of treating surfaces of inorganic particles such as alumina particles, aluminium nitride particles, and the like with oleic acid instead of a surfactant has been known (Choi C, Yoo H S, Oh J M. Preparation and heat transfer properties of nanoparticle-in-transformer oil dispersions as advanced energy efficient coolants. Curr Appl Phys 2008; 8:710-2). However, this method has a problem that a battery module may be corroded due to the acidity of oleic acid, and a portion of particles may be stabilized because agglomerated inorganic particles are not uniformly surface-treated. Therefore, the precipitation problem still remains as an unresolved task.

RELATED DOCUMENT

[Patent Document] KR 2017-0051024 A

DISCLOSURE

Technical Problem

Therefore, the present invention has been made in view of the above problems, and it is one object of the present invention to provide a heat-dissipation fluid composition that exhibits excellent electrical insulating properties and thermal conductivity and, especially, excellent heat dissipation performance even after long-term use in a battery module because thermally conductive inorganic particles are not permanently precipitated in a heat-dissipation fluid including the heat-dissipation fluid composition, upon use of a fluid-cooling method, a method of preparing the heat-dissipation fluid composition, and a battery module and battery pack including the heat-dissipation fluid composition.

The above and other objects can be accomplished by the present disclosure described below.

Technical Solution

In accordance with an aspect of the present invention, the above and other objects can be accomplished by the provision of a heat-dissipation fluid composition including 100 parts by weight of a nonconductive oil; 1 to parts by weight of thermally conductive inorganic particles; and 1 to 30 parts by weight of an inorganic precipitation inhibitor, wherein a viscosity at 20° C. is 850 cP or more, and a viscosity at 30° C. is 750 cP or less.

In accordance with another aspect of the present invention, there is provided A method of preparing a heat-dissipation fluid composition, the method including a) a step of stirring a mixture including 100 parts by weight of a nonconductive oil, 5 to 50 parts by weight of thermally conductive inorganic particles and 5 to 50 parts by weight of an inorganic precipitation inhibitor using a ball mill; b) a step of filtering the stirred mixture; and c) a step of removing air bubbles from the filtered mixture using a vacuum pump, wherein the mixture, from which air bubbles have been removed, has a viscosity of 850 cP or more at 20° C. and a viscosity of 750 cP or less at 30° C.

In accordance with another aspect of the present invention, there is provided a battery module including a module case; a battery cell mounted in the module case; and the heat-dissipation fluid composition filled in the module case.

In accordance with yet another aspect of the present invention, there is a battery pack including two or more battery modules; and a pack case accommodating the battery modules.

Advantageous Effects

As apparent from the fore-going, the present invention advantageously provides a heat-dissipation fluid composition that exhibits excellent electrical insulating properties, without use of an organic substance that has been used to prevent precipitation and is capable of rapidly discharging heat that may cause explosion and, especially, maintaining excellent heat dissipation performance even after long-term use because thermally conductive inorganic particles are not permanently precipitated in a heat-dissipation fluid including the heat-dissipation fluid composition, upon use of a battery-cooling method using a fluid, a method of preparing the heat-dissipation fluid composition, and a battery module and battery pack including the heat-dissipation fluid composition.

DESCRIPTION OF DRAWINGS

FIG. 1 is an exploded perspective view illustrating a module case and a battery module constituted of a battery cell according to an embodiment of the present disclosure. Here, a line for measuring temperature change during charging/discharging is attached to a predetermined position of the module case.

FIG. 2 illustrates a side view of a battery module according to an embodiment of the present disclosure.

FIG. 3 is a graph schematically illustrating temperature change in a battery cell according to an embodiment of the present disclosure during charging/discharging.

BEST MODE

The present inventors have continuously conducted research into minimizing a problem that long-term use causes precipitation of inorganic particles in a battery cooling method using a fluid. As a result, the present inventors confirmed that, when inorganic particles with superior thermal conductivity are dispersed in a heat-dissipation fluid, the viscosity of which is rapidly decreased when heat is generated during charging/discharging and which thus behaves like a liquid, and the viscosity of which rapidly increases in a resting period during which charging and discharging does not occur and which thus behaves like a solid, the inorganic particles are not precipitated, and thus, excellent heat dissipation characteristics are maintained. The present invention has been completed based on the finding.

Hereinafter, a heat-dissipation fluid composition of the present disclosure, a method of preparing the heat-dissipation fluid composition, and a battery module and battery pack including the heat-dissipation fluid composition are respectively described.

Heat-Dissipation Fluid Composition

A heat-dissipation fluid composition of the present disclosure includes 100 parts by weight of a nonconductive oil, 1 to 30 parts by weight of a thermally conductive inorganic particles, and 1 to 30 parts by weight of an inorganic precipitation inhibitor, and has a viscosity of 850 cP or more at 20° C. and a viscosity of 750 cP or less at 30° C. Such a heat-dissipation fluid composition has excellent electrical insulating properties and price competitiveness as well as heat dissipation performance of controlling heat generated from a battery module, thus satisfying all heat-dissipation fluid conditions required in the market. Further, while conventional thermally-conductive inorganic particles are mostly precipitated a few months after being dispersed in a medium, the viscosity of the heat-dissipation fluid composition of the present disclosure is designed to rapidly change according to temperature. Accordingly, inorganic particles in the heat-dissipation fluid composition of the present disclosure are in a high-viscosity state at room temperature, thus not being precipitated even after several years, and are changed to have a low viscosity at high temperature, thus rapidly conducting heat. Accordingly, thermal conductivity is maintained for a long time. That is, the heat-dissipation fluid composition of the present disclosure has high viscosity in a resting period of a battery, whereby precipitation of inorganic particles in a fluid can be prevented, whereas the viscosity of the heat-dissipation fluid is decreased due to heat generated from battery cells during charging/discharging of a battery. Accordingly, flowability increases and thus high thermal conductivity is exhibited.

To prepare such a heat-dissipation fluid, inorganic particles having a density similar to or lower than that of a heat-dissipation fluid were fed into a medium to control the viscosity of the heat-dissipation fluid. In addition, inorganic particles with superior thermal conductivity were additionally added, thereby further increasing the thermal conductivity of the heat-dissipation fluid. A heat-dissipation fluid prepared in this manner has a high viscosity at room temperature, whereby inorganic particles in the heat-dissipation fluid are not precipitated even after a long period.

The viscosity at 20° C. can be, for example, 850 to 2000 cP, or 850 to 1,500 cP, preferably 850 to 1,200 cP, or 860 to 1,100 cP. Within these ranges, flowability is low, and thus, precipitation of the thermally conductive inorganic particles can be effectively prevented.

The viscosity at 30° C. can be, for example, 750 cP or less, or 150 to 750 cP, preferably 300 to 750 cP, or 510 to 740 cP. Within these ranges, flowability is excellent, and thus, excellent thermal conductivity is exhibited.

The density of the inorganic precipitation inhibitor, for example, can be the same as or lower than that of the nonconductive oil, preferably lower than that of the nonconductive oil. In this case, although the inorganic precipitation inhibitor is used for a long time in a heat-dissipation fluid in a battery module, thermally conductive inorganic particles are not precipitated. Accordingly, excellent heat dissipation performance can be maintained.

When the heat-dissipation fluid composition is used as, for example, a heat transfer oil filling a battery module, the viscosity of the heat-dissipation fluid composition is decreased when temperature increases due to heat generated during charging/discharging and thus flowability increases, whereas the viscosity of the heat-dissipation fluid composition increases again when charging/discharging is terminated and the heat-dissipation fluid composition is cooled and thus precipitation of the thermally conductive inorganic particles is prevented. Even when the heat-dissipation fluid composition is used for a long time as a heat-dissipation fluid in a battery module, thermally conductive inorganic particles are not precipitated, whereby excellent heat dissipation performance can be maintained.

The thermally conductive inorganic particles can be used in an amount of, for example, 2 to 25 parts by weight, preferably 3 to 22 parts by weight, most preferably 5 to 20 parts by weight. Within these ranges, excellent dispersion stability and heat dissipation performance are exhibited.

The thermally conductive inorganic particles can be, for example, one or more selected from the group consisting of silica (except for fumed silica), alumina (except for fumed alumina), aluminosilicate, aluminum nitride (AlN), silicon nitride ($Si_3N_4$), and boron nitride (BN). In this case, excellent heat dissipation performance is exhibited.

A primary average particle diameter of the thermally conductive inorganic particles can be, for example, 5 to 900 nm, or 10 to 500 nm, preferably 20 to 350 nm, more preferably 30 to 300 nm. Within these ranges, excellent heat dissipation characteristics are exhibited.

The "primary average particle diameter" of the present disclosure refers to an average particle diameter of single particles (primary particles) that are not agglomerated, and may be measured by means of a scanning electron microscope (SEM). In particular, 20 particles are selected using an SEM, and a diameter of each thereof is measured using a bar icon, followed by finding an average particle diameter using an arithmetic mean.

The thermally conductive inorganic particles are heavier than the inorganic precipitation inhibitor. In particular, the thermally conductive inorganic particles can have a bulk density of 0.2 $g/cm^3$ to 10 $g/cm^3$, or 0.2 $g/cm^3$ to 7 $g/cm^3$, preferably 0.2 $g/cm^3$ to 5 $g/cm^3$. Within these ranges, thermally conductive inorganic particles are not precipitated even when used as a heat-dissipation fluid in a battery module for a long time, and thus excellent heat dissipation performance can be maintained.

In the present disclosure, the bulk density may be measured by a constant capacity method.

The inorganic precipitation inhibitor can be used, for example, in an amount of 2 to 25 parts by weight, preferably 3 to 22 parts by weight, most preferably 5 to 20 parts by weight. Within these ranges, excellent dispersion stability and heat dissipation performance are exhibited.

The inorganic precipitation inhibitor can be, for example, one or more selected from the group consisting of aerogel, fumed silica, and fumed alumina. In this case, precipitation of thermally conductive inorganic particles can be effectively prevented, and thus, excellent heat dissipation performance can be maintained.

The aerogel is not specifically limited so long as it is an aerogel that is generally manufactured, used, or obtainable. The aerogel can be, for example, silicon aerogel, silica aerogel, or a mixture thereof. In this case, precipitation of thermally conductive inorganic particles can be effectively prevented, whereby excellent heat dissipation performance can be maintained and excellent electrical insulating properties can be exhibited.

The fumed silica can be manufactured by, for example, burning a chloride of silicon with a flame. The fumed silica is not specifically limited so long as it is a fumed silica that is generally manufactured, used or commercially available. As a particular example, materials corresponding to CAS Number 112945-52-5 can be used.

The fumed alumina is not specifically limited so long as it is a fumed alumina that is generally manufactured or used or commercially available. As particular examples, AEROXIDE® fumed alumina series, SpectrAl® fumed alumina series, or materials equivalent thereto can be used.

A primary average particle diameter of the inorganic precipitation inhibitor can be, for example, 5 to 900 nm, or 10 to 500 nm, preferably 20 to 250 nm, more preferably 30 to 200 nm. Within these ranges, precipitation of thermally conductive inorganic particles can be inhibited and thus excellent heat dissipation performance can be maintained, even when used as a heat-dissipation fluid in a battery module for a long time.

A bulk density of the inorganic precipitation inhibitor can be, for example, 0.2 $g/cm^3$ or less, or 0.0005 $g/cm^3$ to 0.2 $g/cm^3$, preferably 0.001 to 0.2 $g/cm^3$. Within these ranges, precipitation of thermally conductive inorganic particles can be effectively prevented, and thus, excellent heat dissipation performance can be maintained.

The sum of the weights of the thermally conductive inorganic particles and the inorganic precipitation inhibitor can be, for example, 5 to 50 parts by weight or 5 to 40 parts by weight, preferably 10 to 30 parts by weight. Within these ranges, excellent dispersion stability and heat dissipation performance are exhibited.

A weight ratio of the thermally conductive inorganic particles to the inorganic precipitation inhibitor can be, for example, 5:1 to 1:5, or 3:1 to 1:3, preferably 2:1 to 1:2. Within these ranges, excellent dispersion stability and heat dissipation performance are exhibited.

The nonconductive oil can be, for example, one or more selected from the group consisting of mineral oil, silicone oil, and vegetable oil, preferably silicone oil or vegetable oil. In this case, insulating properties are excellent, and precipitation of thermally conductive inorganic particles can be prevented even when used as one component of a heat-dissipation fluid in a battery module for a long time because the nonconductive oil is combined with the conductive inorganic particles and the inorganic precipitation inhibitor of the present disclosure and thus excellent heat dissipation performance can be maintained. When silicone oil, mineral oil, or vegetable oil with low electrical conductivity is only used, there is a limitation in controlling heat generated from a battery module due to low thermal conductivity. However, when the thermally conductive inorganic particles and the like according to the present disclosure are added to the oil with low electrical conductivity, thermal conductivity is increased and, upon application to a battery module, heat dissipation characteristics of a battery module can be greatly improved.

The vegetable oil can be, for example, soybean oil. In this case, insulating properties are excellent, and precipitation of thermally conductive inorganic particles can be prevented even when used as one component of a heat-dissipation fluid in a battery module for a long time because the nonconductive oil is combined with the conductive inorganic particles and the inorganic precipitation inhibitor of the present disclosure and thus excellent heat dissipation performance can be maintained.

The viscosity of the nonconductive oil can be, for example, 150 to 600 cP, or 200 to 550 cP (20° C.). In this case, insulating properties are excellent, and precipitation of thermally conductive inorganic particles can be prevented because the nonconductive oil is combined with the conductive inorganic particles and the inorganic precipitation inhibitor of the present disclosure and thus excellent heat dissipation performance is exhibited.

The density of the nonconductive oil can be, for example, 0.8 to 1.2 $g/cm^3$, or 0.9 to 1 $g/cm^3$. In this case, insulating properties are excellent, and excellent heat dissipation performance can be maintained even when used as one component of a heat-dissipation fluid in a battery module for a long time because the nonconductive oil is combined with the conductive inorganic particles and the inorganic precipitation inhibitor of the present disclosure.

The heat-dissipation fluid composition can have, for example, a dispersion stability of 90% or more, preferably 95% or more, more preferably 99% or more, most preferably 100%. Here, the dispersion stability is a value, expressed in percent, indicating a maximum height of a particle layer, settled from a maximum height of a liquid surface after 30 days of retention, based on the height of a particle layer being 100 when a heat-dissipation fluid is poured into a mass cylinder. Within these ranges, excellent heat dissipation characteristics are maintained even during long-term charging/discharging.

The heat-dissipation fluid composition can have, for example, a dielectric constant of 3.2 or more, 3.2 to 4.5, or 3.23 to 4.13 under conditions of 42 ml of a heat-dissipation fluid and 25° C. Within these ranges, heat dissipation characteristics, electrical insulating properties, and economic feasibility are all excellent.

Method of Preparing Heat-Dissipation Fluid Composition

A method of preparing a heat-dissipation fluid composition of the present disclosure includes a) a step of stirring a mixture including 100 parts by weight of a nonconductive oil, 5 to 50 parts by weight of thermally conductive inorganic particles and 5 to 50 parts by weight of an inorganic precipitation inhibitor using a ball mill; b) a step of filtering the stirred mixture; and c) a step of removing air bubbles from the filtered mixture using a vacuum pump, wherein the mixture, from which air bubbles have been removed, has a viscosity of 850 cP or more at 20° C. and a viscosity of 750 cP or less at 30° C. Within these ranges upon use of a battery cooling method using a fluid, electrical insulating properties are excellent and heat causing explosion can be rapidly discharged. In particular, since thermally conductive inorganic particles in the heat-dissipation fluid are not permanently precipitated, excellent heat dissipation performance can be maintained even after long-term use.

The nonconductive oil, the thermally conductive inorganic particles, the inorganic precipitation inhibitor, and the like of step a) are the same as those of the heat-dissipation fluid composition described above, and thus, detailed description thereof is omitted.

The ball mill of step a) may be, for example, a rotatable cylindrical vessel containing a metal ball. As another example, the ball mill may be a cylindrical reactor containing a metal ball. In this case, dispersibility of inorganic particles in the heat-dissipation fluid composition is improved.

A particle diameter of the metal ball may be, for example, 0.5 to 2 mm, or 0.5 to 1.5 mm. Within these ranges, agglomerated secondary inorganic particles are effectively decomposed into primary inorganic particles, and thus, dispersibility of inorganic particles in the heat-dissipation fluid composition is improved.

The metal ball is not specifically limited so long as it is a metal ball generally used in the technical field to which the present disclosure pertains. The metal ball may be preferably a zirconia ball. In this case, dispersibility of inorganic particles in the heat-dissipation fluid composition is improved.

The filtering of step b) and the air bubble removal of step c) may be obviously performed by those skilled in the art and are not specifically limited so long as they are methods generally performed in the technical field to which the present disclosure pertains.

Battery Module

A battery module of the present disclosure is characterized by including a module case; a battery cell mounted in the module case; and a heat-dissipation fluid composition of the present disclosure filled in the module case. Hereinafter, description of technical contents not directly related to the present invention is omitted so as not to obscure the gist of the present disclosure, but it is obvious that the technical contents can be appropriately applied by those skilled in the art.

The heat-dissipation fluid composition can be filled, for example, up to 90% or less, 80% or less, or 30 to 80% of an internal height of the module case. Within these ranges, heat dissipation performance is excellent.

In the present disclosure, "the internal height of the module case" denotes a shortest distance from the bottom of the module case to the top thereof when the module case is sealed.

The module case can be made of, for example, plastic, aluminum, stainless steel, or a combination of two or more thereof. In this case, heat dissipation performance is excellent.

The plastic can be, for example, polyethylene terephthalate (PET). In this case, heat dissipation performance is excellent.

The battery cell can have, for example, a maximum voltage of less than 65 V, or 20 V to 55 V. Within these ranges, electrical insulating properties and heat dissipation performance are excellent.

Hereinafter, an embodiment of the battery module of the present disclosure is described in more detail with reference to the drawings, but it should be understood that the scope of the present invention is not limited thereto.

FIG. 1 is an exploded perspective view illustrating a module case and a battery module constituted of a battery cell according to an embodiment of the present disclosure, FIG. 2 illustrates a side view of a battery module according to an embodiment of the present disclosure, and FIG. 3 is a graph schematically illustrating temperature change in a battery cell according to an embodiment of the present disclosure during charging/discharging.

Referring to FIG. 1, a battery cell is mounted in a module case, and then a heat-dissipation fluid composition of the present disclosure is filled up to a predetermined height as needed in a range of 90% or less of an internal height of the module case. In an example, the heat-dissipation fluid composition was filled up to 30% or 80% of an internal height of the module case. To investigate heat dissipation characteristics of the heat-dissipation fluid composition by measuring an internal temperature of the battery module during charging/discharging, temperature sensing lines were attached to several parts of the module case and the battery cell. External terminals (plates) are connected to both sides of the battery cell. The external terminals serve to electrically connect an external device (not shown) to the battery cell.

Referring to FIG. 2, a battery cell is mounted in a module case, and the remaining space is filled with a heat-dissipation fluid composition. An enclosure of the module case is made of aluminum, and arrows indicate the module case, the battery, and the external terminals (plates).

Referring to FIG. 3, a battery cell is heated and thus reaches a maximum charging temperature during charging, and then the battery cell is cooled in a resting period in which charging/discharging does not occur. During discharging, the battery cell is heated again and reaches a maximum discharging temperature after some time. A heat dissipation degree of the heat-dissipation fluid composition may be measured by examining a maximum charging temperature and a maximum discharging temperature. When a maximum charging temperature and a maximum discharging temperature are low, it can be confirmed that the heat-dissipation fluid composition rapidly conducts heat generated from a battery cell during charging/discharging. It was confirmed that, when the heat-dissipation fluid composition of the present disclosure is applied to a battery module, a maximum charging temperature and a maximum discharging temperature are greatly decreased.

Battery Pack

A battery pack of the present disclosure is characterized by including two or more battery modules according to the present disclosure; and a pack case accommodating the battery modules. Such a battery pack has excellent internal electrical insulating properties and may rapidly discharge heat causing explosion. In particular, since thermally conductive inorganic particles in the heat-dissipation fluid are not permanently precipitated, excellent heat dissipation performance is maintained even after long-term use.

Hereinafter, description of technical contents not directly related to the present invention is omitted so as not to obscure the gist, but it is obvious that the technical contents can be applied as needed by those skilled in the art.

The battery pack of the present disclosure may include, for example, 2 to 30 battery modules or 5 to 20 battery modules according to the present disclosure. Within these ranges, both electrical characteristics and heat dissipation performance are excellent.

Now, the present disclosure will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

20 g of fumed silica with a primary average particle diameter of 30 nm was fed into a 1 L cylindrical reactor containing 1 kg of a zirconia ball with a particle diameter of 1 mm, and 20 g of alumina with a particle size of 30 nm was additionally added thereto. Subsequently, 400 g of soybean oil was added to the reactor, followed by stirring for two hours using a ball mill. After stirring for two hours, the fluid, except for the zirconia ball, was filtered, and air bubbles in the fluid were removed for two hours using a vacuum pump, thereby preparing a heat-dissipation fluid composition. The prepared heat-dissipation fluid composition was fed into a battery housing. Particularly, the prepared heat-dissipation fluid composition was fed up to 30% or 80% of a height of the module case. A heat dissipation temperature of the battery cell was measured while alternately repeating charging and discharging as described in the following measurement method. Here, the viscosity of the heat-dissipation fluid composition, measured under the following conditions using a Brookfield viscometer, was 910 cP at 20° C. and 600 cP at 30° C.

Example 2

An experiment was carried out in the same manner as in Example 1, except that fumed alumina with an average particle diameter of 200 nm was used instead of the fumed silica with an average particle diameter of 30 nm. Here, the viscosity of the heat-dissipation fluid composition, measured under the following conditions using a Brookfield viscometer, was 880 cP at 20° C. and 550 cP at 30° C.

Example 3

An experiment was carried out in the same manner as in Example 1, except that aerogel (silica aerogel, LG Chem) was used instead of the fumed silica. Here, the viscosity of the heat-dissipation fluid composition, measured under the following conditions using a Brookfield viscometer, was 1080 cP at 20° C. and 720 cP at 30° C.

Example 4

An experiment was carried out in the same manner as in Example 1, except that silicone oil was used instead of the soybean oil. Here, the viscosity of the heat-dissipation fluid composition, measured under the following conditions using a Brookfield viscometer, was 860 cP at 20° C. and 510 cP at 30° C.

Example 5

An experiment was carried out in the same manner as in Example 1, except that alumina with an average particle diameter of 300 nm was used instead of the alumina with an average particle diameter of 30 nm, and each of fumed silica and the alumina was used in an amount of 15 parts by weight based on 100 parts by weight of a nonconductive oil. Here, the viscosity of the heat-dissipation fluid composition, measured under the following conditions using a Brookfield viscometer, was 900 cP at 20° C. and 580 cP at 30° C.

Example 6

An experiment was carried out in the same manner as in Example 1, except that alumina with an average particle diameter of 300 nm was used instead of the alumina with an average particle diameter of 30 nm, fumed alumina with an average particle diameter of 200 nm was used instead of the fumed silica with an average particle diameter of 30 nm, the alumina with an average particle diameter of 300 nm was used in an amount of 20 parts by weight based on 100 parts by weight of a nonconductive oil, and the fumed alumina with an average particle diameter of 200 nm was used in an amount of 10 parts by weight based on 100 parts by weight of the nonconductive oil. Here, the viscosity of the heat-dissipation fluid composition, measured under the following conditions using a Brookfield viscometer, was 1050 cP at 20° C. and 710 cP at 30° C.

Example 7

An experiment was carried out in the same manner as in Example 1, except that alumina with an average particle diameter of 300 nm was used instead of the alumina with an average particle diameter of 30 nm, fumed alumina with an average particle diameter of 200 nm was used instead of the fumed silica with an average particle diameter of 30 nm, the alumina with an average particle diameter of 300 nm was used in an amount of 10 parts by weight based on 100 parts by weight of a nonconductive oil, and the fumed alumina with an average particle diameter of 200 nm was used in an amount of 20 parts by weight based on 100 parts by weight of the nonconductive oil. Here, the viscosity of the heat-dissipation fluid composition, measured under the following conditions using a Brookfield viscometer, was 1100 cP at 20° C. and 740 cP at 30° C.

Comparative Example 1

An experiment was carried out in the same manner as in Example 1, except that FR-3 insulating oil, manufactured by Cargill, including a vegetable oil as a main ingredient was used instead of the heat-dissipation fluid composition. Here, the viscosity of the heat-dissipation fluid composition, measured under the following conditions using a Brookfield viscometer, was 250 cP at 20° C. and 110 cP at 30° C.

Comparative Example 2

An experiment was carried out in the same manner as in Example 1, except that a total content of inorganic particles was 2 parts by weight based on 100 parts by weight of a nonconductive oil (weight ratio of fumed silica to alumina=1:1). Here, the viscosity of the heat-dissipation fluid composition, measured under the following conditions using a Brookfield viscometer, was 310 cP at 20° C. and 120 cP at 30° C.

Comparative Example 3

An experiment was carried out in the same manner as in Example 1, except that a total content of inorganic particles was 70 parts by weight based on 100 parts by weight of a nonconductive oil (weight ratio of fumed silica to alumina=30:40). Here, the viscosity of the heat-dissipation fluid composition, measured under the following conditions using a Brookfield viscometer, was 2350 cP at 20° C. and 1720 cP at 30° C.

Comparative Example 4

An experiment was carried out in the same manner as in Example 1, except that an aerogel (silica aerogel, LG Chem) with a primary average particle diameter of 1 μm was used instead of the fumed silica with an average particle diameter of 30 nm. Here, the viscosity of the heat-dissipation fluid composition, measured under the following conditions using a Brookfield viscometer, was 1200 cP at 20° C. and 930 cP at 30° C.

Comparative Example 5

An experiment was carried out in the same manner as in Example 1, except that alumina with a primary average particle diameter of 2 μm was used instead of the alumina with an average particle diameter of 30 nm, and an aerogel (silica aerogel, LG Chem) with an average particle diameter of 3 nm was used instead of the fumed silica with an average particle diameter of 30 nm. Here, the viscosity of the heat-dissipation fluid composition, measured under the following conditions using a Brookfield viscometer, was 980 cP at 20° C. and 890 cP at 30° C.

Comparative Example 6

An experiment was carried out in the same manner as in Example 1, except that alumina with a primary average particle diameter of 3 nm was used instead of the alumina with an average particle diameter of 30 nm. Here, the viscosity of the heat-dissipation fluid composition, measured under the following conditions using a Brookfield viscometer, was 1000 cP at 20° C. and 870 cP at 30° C.

Test Example

The properties of heat-dissipation fluid compositions prepared according to Examples 1 to 7 and Comparative Examples 1 to 6 were measured by the following methods. Results are summarized in Table 1 below.

Battery heat dissipation test method: A temperature sensing line was attached to each of a housing of battery modules including battery cells and the battery cells, and the housing was filled with a nonconductive fluid. Here, the nonconductive fluid was filled up to a level of 30% or 80% of an internal height of the housing. An internal temperature of the housing was recorded via charging for 0.5 hours, resting for 2 hours, and then discharging for 0.5 hours. The highest battery cell temperatures are compared in Table 1.

(Dispersion) Stability: The prepared heat-dissipation fluid was poured into a mass cylinder, and, at this time, the height of a particle layer was set to 100. The maximum height of a settled particle layer relative to the maximum height of a liquid surface after 30 days of retention was expressed in percent.

Viscosity: Measured using a Brookfield viscometer (model name: DV-II+Pro, RV) under conditions such as rpm=50, temperature=20° C. and 30° C., and spindle=SC4 27. Here, the amount of a sample was fixed to 15.5 g.

Electrical insulating properties (dielectric constant): Measured using a dielectric analyzer (Sunraytech, model No. 871) under conditions such as a liquid volume of 42 ml and 25° C.

TABLE 1

| Classification | Nonconductive oil | Thermally conductive inorganic particles | Inorganic precipitation inhibitor | Stability | Electrical insulating properties | Highest cell temperature (80% of insulating oil supplied) | Highest cell temperature (30% of insulating oil supplied) |
| --- | --- | --- | --- | --- | --- | --- | --- |
| Example 1 | Soybean oil | 30 nm alumina | 30 nm fumed silica | 100 | 3.25 | 50.25 | 52.7 |
| Example 2 | Soybean oil | 30 nm alumina | 200 nm fumed alumina | 100 | 3.37 | 49 | 50.85 |
| Example 3 | Soybean oil | 30 nm alumina | 30 nm aerogel | 100 | 3.29 | 52 | 54.5 |
| Example 4 | Silicon oil | 30 nm alumina | 30 nm fumed silica | 95 | 4.13 | 51 | 53 |
| Example 5 | Soybean oil | 300 nm alumina | 30 nm fumed silica | 95 | 3.27 | 50.5 | 53 |
| Example 6 | Soybean oil | 300 nm alumina | 200 nm fumed alumina | 100 | 3.25 | 49 | 50.90 |
| Example 7 | Soybean oil | 300 nm alumina | 200 nm fumed alumina | 100 | 3.23 | 51 | 53.5 |
| Comparative Example 1 | V-oil only | — | — | — | 3.13 | 57 | 60 |
| Comparative Example 2 | Soybean oil | 30 nm alumina | 30 nm fumed silica | 50 | 3.28 | 54 | 57 |
| Comparative Example 3 | Soybean oil | 30 nm alumina | 30 nm fumed silica | 100 | 3.25 | 54 | 56.4 |
| Comparative Example 4 | Soybean oil | 30 nm alumina | 1 μm aerogel | 60 | 3.31 | 55 | 57 |
| Comparative Example 5 | Soybean oil | 2 μl alumna | 3 nm aerogel | 30 | 3.32 | 56 | 57.5 |
| Comparative Example 6 | Soybean oil | 3 nm alumina | 30 nm fumed silica | 70 | 3.26 | 56 | 57 |

As shown in Table 1, it was confirmed that, in the battery modules (Examples 1 to 7) to which the heat-dissipation fluid composition of the present disclosure was applied, the maximum temperatures of the battery cells during charging/discharging were greatly decreased, and thus, excellent thermal conductivity, precipitation stability, and excellent electrical insulating properties were exhibited, compared to the conventional heat-dissipation fluid (Comparative Example 1) or the cases that were outside the heat-dissipation fluid composition range of the present disclosure (Comparative Examples 2 to 6).

In addition, it was confirmed that, in the heat-dissipation fluid compositions (Comparative Examples 1 and 2) in which the viscosity at 30° C. was 750 cP or less as in the example according to the present disclosure, but the viscosity at 20° C. was less than 850 cP unlike the example according to the present disclosure, thermal conductivity and stability are greatly decreased. On the other hand, it was confirmed that, in the heat-dissipation fluid compositions (Comparative Examples 3 and 6) in which the viscosity at 20° C. was 850 cP or more as in the example according to the present disclosure, but the viscosity at 30° C. was greater than 750 cP unlike the example according to the present disclosure, electrical insulating properties are greatly changed, but thermal conductivity and stability are greatly decreased.

The invention claimed is:

1. A heat-dissipation fluid composition, comprising:
    100 parts by weight of a nonconductive oil that is one or more selected from the group consisting of mineral oil and vegetable oil;
    1 to 30 parts by weight of thermally conductive inorganic particles that are one or more selected from the group consisting of a silica that is not a fumed silica, an alumina that is not a fumed alumina, aluminosilicate, and silicon nitride ($Si_3N_4$), wherein a primary average particle diameter of the thermally conductive inorganic particles is 10 to 500 nm; and
    1 to 30 parts by weight of an inorganic precipitation inhibitor that is one or more selected from the group consisting of an aerogel, a fumed silica and a fumed alumina, wherein a primary average particle diameter of the inorganic precipitation inhibitor is 10 to 500 nm,
    wherein a viscosity measured at 20° C. and 50 rpm is 850 cP or more, and a viscosity measured at 30° C. and 50 rpm is 750 cP or less.

2. The heat-dissipation fluid composition according to claim 1, wherein a density of the inorganic precipitation inhibitor is the same as or lower than a density of the nonconductive oil.

3. The heat-dissipation fluid composition according to claim 1, wherein the heat-dissipation fluid composition is a heat transfer oil for filling a battery module, and a viscosity of the heat transfer oil is decreased when temperature increases due to heat generated during charging or discharging, and thus, flowability increases, whereas viscosity of the heat transfer oil increases again when charging or discharging is terminated and a battery is cooled, and thus, precipitation of the thermally conductive inorganic particles is prevented.

4. The heat-dissipation fluid composition according to claim 1, wherein the primary average particle diameter of the thermally conductive inorganic particles is 20 to 350 nm.

5. The heat-dissipation fluid composition according to claim 1, wherein a bulk density of the thermally conductive inorganic particles is 0.2 g/cm$^3$ to 5 g/cm$^3$.

6. The heat-dissipation fluid composition according to claim 1, wherein a bulk density of the inorganic precipitation inhibitor is 0.2 g/cm$^3$ or less.

7. The heat-dissipation fluid composition according to claim 1, wherein the nonconductive oil is a soybean oil.

8. The heat-dissipation fluid composition according to claim 1, wherein the heat-dissipation fluid composition has a dispersion stability of 90% or more, the dispersion stability denoting, in percent, a maximum height of a settled particle layer relative to a maximum height of a liquid surface, after 30 days of retention, based on 100% being a height of a particle layer when the heat-dissipation fluid composition is first poured into a mass cylinder.

9. A method of preparing a heat-dissipation fluid composition, the method comprising:
  a) stirring using a ball mill a mixture comprising:
    100 parts by weight of a nonconductive oil that is one or more selected from the group consisting of mineral oil and vegetable oil;
    1 to 30 parts by weight of thermally conductive inorganic particles that are one or more selected from the group consisting of a silica that is not a fumed silica, an alumina that is not a fumed alumina, aluminosilicate, and silicon nitride (Si$_3$N$_4$), wherein a primary average particle diameter of the thermally conductive inorganic particles is 10 to 500 nm, and 1 to 30 parts by weight of an inorganic precipitation inhibitor that is one or more selected from the group consisting of an aerogel, a fumed silica and a fumed alumina, wherein a primary average particle diameter of the inorganic precipitation inhibitor is 10 to 500 nm;
  b) filtering the stirred mixture to yield a filtered fluid mixture; and
  c) removing air bubbles from the filtered fluid mixture using a vacuum pump to yield the heat-dissipation fluid composition,
  wherein the heat-dissipation fluid composition has a viscosity of 850 cP or more measured at 20° C. and 50 rpm, and a viscosity of 750 cP or less measured at 30° C. and 50 rpm.

10. A battery module, comprising:
  a module case;
  a battery cell mounted in the module case; and
  a heat-dissipation fluid composition comprising:
    100 parts by weight of a nonconductive oil;
    1 to 30 parts by weight of thermally conductive inorganic particles; and
    1 to 30 parts by weight of an inorganic precipitation inhibitor,
    wherein a viscosity measured at 20° C. and 50 rpm is 850 cP or more, and a viscosity measured at 30° C. and 50 rpm is 750 cP or less,
  filled in the module case.

11. The battery module according to claim 10, wherein the heat-dissipation fluid composition is filled up to 90% or less of an internal height of the module case.

12. The battery module according to claim 10, wherein the module case is made of plastic, aluminum, stainless steel, or a combination of two or more thereof.

13. The battery module according to claim 10, wherein the battery cell has a maximum voltage of less than 65 V.

14. A battery pack, comprising two or more battery modules according to claim 10; and a pack case accommodating the battery modules.

15. The method of claim 9, wherein the primary average particle diameter of the thermally conductive inorganic particles is 20 to 350 nm.

* * * * *